Nov. 19, 1963    M. C. JUNGER    3,111,595

LOW FREQUENCY RESONANT TRANSDUCERS

Filed Sept. 25, 1959    3 Sheets-Sheet 1

INVENTOR.
MIGUEL C. JUNGER
BY
ATTORNEY

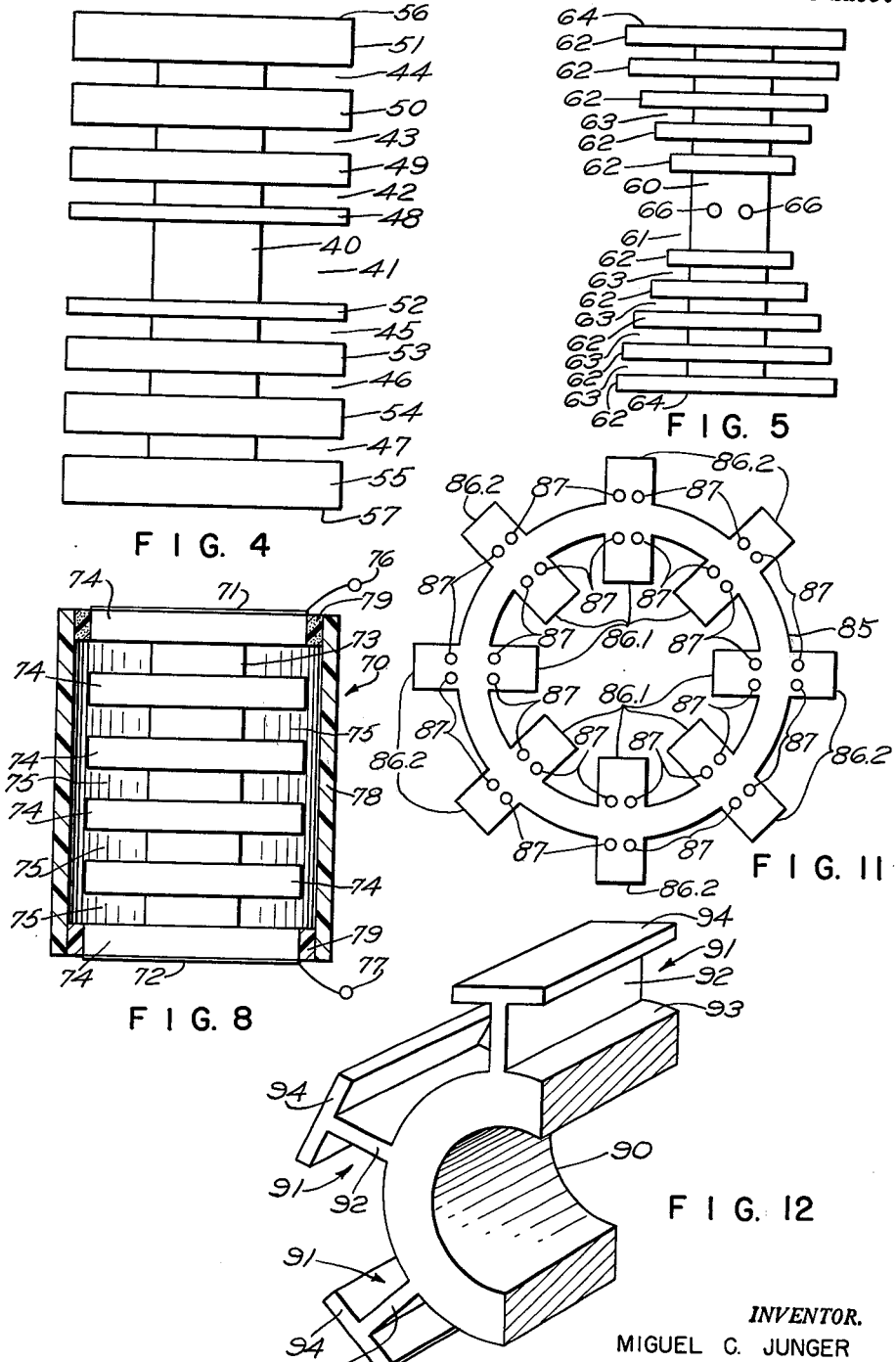

Nov. 19, 1963      M. C. JUNGER      3,111,595
LOW FREQUENCY RESONANT TRANSDUCERS
Filed Sept. 25, 1959      3 Sheets-Sheet 3

*INVENTOR.*
MIGUEL C. JUNGER
BY
ATTORNEY

3,111,595
LOW FREQUENCY RESONANT TRANSDUCERS
Miguel C. Junger, Cambridge, Mass., assignor to Acoustica Associates, Inc., Plainview, N.Y., a corporation of New York
Filed Sept. 25, 1959, Ser. No. 842,384
16 Claims. (Cl. 310—8.2)

This invention relates in general to elastic wave vibrators, and more particularly to electromechanical transducers which are especially suitable for low frequency operation and methods of manufacturing the same.

Among the most widely used forms of electromechanical transducers is the form in which the physical size of the transducer is related to the wavelength therein of elastic waves at the operating frequency (e.g., they are resonant vibrators). Common among the embodiments of this form is the half-wave longitudinal vibrator. The most common type of such transducer consists of a cylindrical or rectangular bar performing vibrations in the direction of its longitudinal axis. If the length dimension of this type of transducer is "L" and if its "bar velocity," i.e., the velocity of compressional waves in the transducer material, is equal to "c," then the lowest natural frequency, in cycles per second, of such a transducer is given by $f = c/2L$.

Among the most common types of electromechanical transducer materials useful for low frequency irradiation of liquids, for example, are barium titanate, lead zirconate and ferrites, which are usually formed in dies and machined, or magnetostrictive materials, generally nickel-iron alloys, which are usually assembled as stacks of stamped laminations. Since the bar velocity of these materials lies between 4,000 and 5,000 meters/second half-wave longitudinal transducers made of them must be impractically long in order to realize a transducer resonant at a low frequency. Due to the relatively high speed of most forms of elastic waves in these transducer materials longitudinal and other forms of resonant electromechanical vibrators made of them become prohibitively bulky, heavy and costly when designed for use at lower frequencies, such as the lower audible frequencies. Thus, heretofore half-wave transducers, for example, have been commonly found in sizes intended for use at 20 kc./sec., 40 kc./sec., and higher frequencies, but rarely are they found designed for operation at frequencies below 9 or 10 kc./sec. At 10 kc./sec., one would need a 25 cm. long longitudinal transducer, approximately, or a ring transducer having a 17 cm. diameter, approximately.

It is a general object of the present invention to reduce the dimensions of resonant low frequency electromechanical (or sonic) transducers, and to provide such transducers which are capable of being operated as resonant vibrators at lower frequencies with little or no increase in physical size. Another object of the invention is to provide methods and means to reduce by approximately half or more the frequency at which a transducer of a given size can be operated as a resonant vibrator. More specifically, it is an object of the invention to provide methods and means to add inertia to the vibratory motion of a transducer and thereby to lower the phase velocity of elastic waves therein, without causing any significant increase in the rigidity or stiffness of the transducer. A further object is to provide methods and means to control the Q of the transducer, so that it remains unchanged, or changes only by a controlled amount, with the addition of such inertia. An additional object is to add such inertia in an optimum manner, to obtain the maximum effects from a given inertial addition.

As the resonant frequency of a given electromechanical transducer is lowered, the transducer should become increasingly larger in order to retain suitable dimensions relative to the wavelength therein of elastic waves at the operating frequency. In a cylindrical longitudinal vibrator, for example, the diameter of the end surface should measure at least approximately 70 percent of one wavelength, to assure adequate coupling of the end surface to a liquid medium, but this condition is never achieved at low frequency. It is an additional object of this invention to provide methods and means simultaneously to reduce the natural frequency of a resonant electromechanical transducer and to increase the coupling between the transducer and an adjacent fluid medium. More specifically, it is an object of the invention to add inertia to the vibratory motion of a transducer in a manner which simultaneously provides increased coupling between the transducer and an adjacent fluid medium. It is a further object of the invention to provide methods and means to control the increase in coupling independently of the addition of inertia. Another object of the invention is to provide methods and means simultaneously to reduce the natural frequency of a resonant electromechanical transducer and to control either or both of the coupling between the transducer and an adjacent liquid medium and the Q of the transducer, independently of the reduction in natural frequency and independently of each other.

According to the invention, inertial masses, in the form of fins or other projections, are added to a transducer in a manner which increases the inertia, and hence increases the kinetic energy during vibration, and which avoids or minimizes any increase of the amount of material which is placed under stress during vibration, thereby avoiding or minimizing any simultaneous increase in potential energy during vibration. In the case of a longitudinal standing wave (i.e., resonant) transducer, fins may be added as inertial elements which are disposed circumferentially relative to the longitudinal or axial dimension, in a manner which simultaneously lowers the effective velocity of elastic waves in the transducer material, and improves the coupling between the transducer and a surrounding fluid medium. In such a longitudinal standing wave transducer (as opposed to a longitudinal traveling wave conductor) the inertial elements are preferably added in the antinodal regions, where the maximum velocity occurs during vibration, rather than in the nodal areas, where the maximum stress occurs. By avoiding or minimizing any increase in the amount of material which is placed under stress during vibration, one achieves the maximum benefit in lowering the natural frequency of resonance of a transducer. This is due to the facts that an increase in the rigidity of the transducer would tend to compensate for the added inertia, and the addition of material which is placed under stress during vibration would increase the rigidity of the transducer.

As a general rule, the natural frequency of a resonant electromechanical transducer can be reduced by adding inertia in order to increase kinetic energy during vibration, according to the present invention, or by removing material under stress so as to reduce potential energy during vibration, as is described and claimed in the copending application of Harry W. Kompanek, Serial No. 825,143, filed July 6, 1959, for "Elastic Wave Vibrator," and which is assigned to the same assignee as the present application. The addition of inertia raises the Q of the transducer, while, as is mentioned in said copending application, the removal of transducer material lowers the Q of the transducer. According to the present invention, the Q of a resonant electromechanical transducer is controlled independently of the change in its natural frequency when inertia is added by simultaneously removing transducer material to compensate for the increase in Q due to the additional inertia. Preferably, the transducer material is removed from a region in the transducer which is under stress during vibration, and inertia is added to a region where the maximum velocity occurs during vibration.

In another aspect, this application discloses improvements upon the inventions which are described and claimed in my copending applications, Serial No. 591,622, filed June 15, 1956, for "Sonic Wave Conductor," and Serial No. 790,330, filed February 10, 1959, for "Elastic Wave Conductor," relating, among other things, to the use of inertial elements in a traveling wave conductor of elastic wave energy to lower the effective or phase velocity of elastic waves in a wave conductor. According to the present invention, the dimensions of the inertial elements are chosen relative to other dimensions of a wave conductor according to principles which assure that the maximum effect of the inertial loading of the wave conductor will be achieved toward lowering the effective or phase velocity. In general, the maximum reduction in phase velocity, and hence in the natural frequency of a standing wave conductor (e.g., a longitudinally resonant transducer) is achieved when the ratio of fin width to the spacing between adjacent fins has an order of magnitude which is approximately unity.

The foregoing and other objects and features of the invention will become apparent from the following description of certain embodiments. This description refers to the accompanying drawings, wherein:

FIG. 4 illustrates in side elevation a longitudinal transducer having added inertia predominantly in the antinodal regions;

FIG. 5 is a side elevation of another longitudinal transducer with added inertia predominantly in antinodal regions, and having transducer material removed from the nodal region;

FIG. 8 is a longitudinal transducer with inertial fins and a shroud to control coupling to the surrounding medium;

FIGS. 9, 10, 11 and 12 are radial transducers modified according to the invention.

Figure 1:
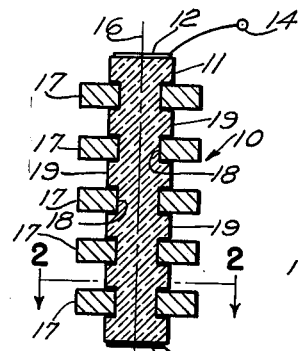
FIG. 1 shows in side section a longitudinal transducer of piezoelectric material with circumferential inertial members of another material affixed to it.
Figure 2:
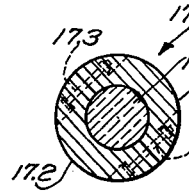
FIG. 2 is a cross-section along line 2—2 of FIG. 1.

In FIGS. 1 and 2, a longitudinal transducer 10, consisting of an elongated cylinder 11 of piezoelectric or electrostrictive material, such as barium titanate, has electrodes 12 and 13 affixed to its ends and connected to terminals 14 and 15 in a well-known fashion. As so constructed, the cylinder 11 is mechanically resonant to a frequency of mechanical vibration at which it is preferably one half-wave (but may be one or more half-waves) long, in the direction of the axis 16—16, relative to compressional waves at that frequency propagating along the axis. Inertia members 17 are affixed circumferentially to the cylinder 11 at a plurality of locations spaced axially apart on the cylinder. As shown in FIGS. 1 and 2, these members are achieved by machining or otherwise forming shallow circumferential slots 18 in the cylinder 11 and clamping the ring-shaped inertia members 17 around the slots. To this end, each ring may be made in two parts 17.1 and 17.2, fastened together by bolts 17.3, shown in dotted line, in a well-known manner. When assembled on the cylinder 11, the inertia members 17 have the appearance of fins separated by spacing slots 19. Alternatively, fins can be achieved on the cylinder 11 by machining spacing slots 19 in a starting cylinder of the larger outer diameter; in the latter case, the fins will be made of the same material as the cylinder 11. In the specific embodiment shown in FIG. 1, the fins 17 can be made of a material which has a greater or lesser density than the cylinder 11. In any event, the fins 17, whether made of the same or different material, will increase the effective inertia of the cylinder 11 and will lower its bar velocity, and consequently, the resonant length of the transducer will be lowered. This will be true whether the cylinder 11 is solid or tubular.

If the fins 17 are machined out of a solid bar or rod or a thick-walled cylinder of starting material, the bar velocity of the material, and hence the resonant length of the transducer at a given frequency, can be reduced by a factor of approximately two (2), if the operating frequency of the transducer is well below the natural frequency of vibration of the fins 17, so that the fins themselves are nonresonant at the operating frequency of the transducer. Even greater reductions in bar velocity and resonant frequency of the transducer, with nonresonant fins, can be achieved with the structure of FIG. 1 if the fins 17 are made of a material which is more dense than that of the cylinder 11. In either case, even greater reduction of bar velocity can be achieved by selecting a fin geometry which results in a fundamental natural frequency of the fins undergoing axially-symmetrical (i.e., "umbrella mode") vibrations, which natural frequency lies only slightly above the operating frequency of the transducer.

Figure 6:
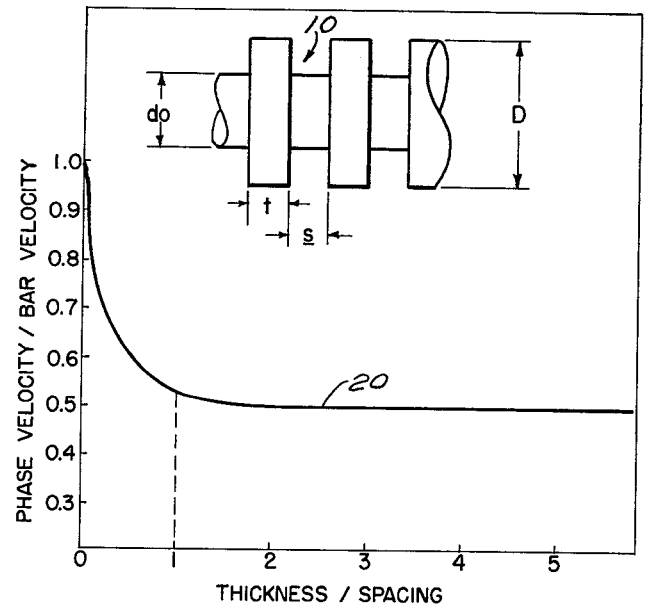
FIGS. 6 and 7 are graphs to explain the invention.
Figure 7:
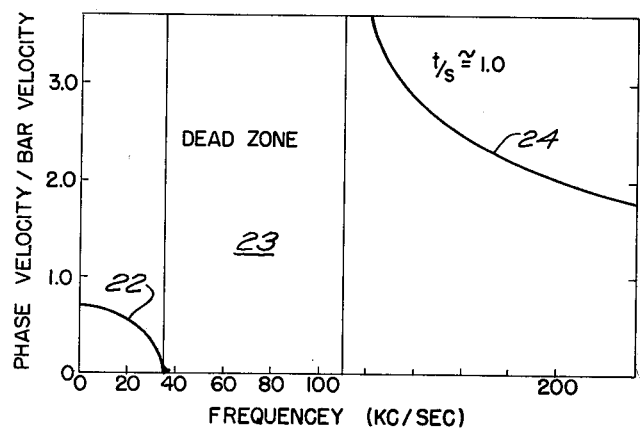

Reference is now made to FIGS. 6 and 7, to assist in explaining the invention. In FIG. 6 there is represented a cylindrical axially symmetrical transducer 10 as illustrated in FIG. 1. Using the same reference characters as in FIG. 1:

"$d_0$" is the diameter of the cylinder 11;
"$D$" is the diameter of the fins 17;
"$t$" is the thickness of each fin 17; and
"$s$" is the width of each spacing slot 19.

The curve 20 represents the magnitude of the ratio of phase velocity in the loaded bar to the original bar velocity, against the magnitude of the ratio $t/s$. It is assumed that the fins are of such thickness $t$ that they are not excited near resonance—their resonance frequency lies above the operating frequency of the transducer. It is then found that as the ratio $t/s$ is increased, from a value where the thickness $t$ is very small compared with the slot spacing $s$ to a value approaching unity, the phase velocity first drops appreciably, from a value where it is nearly equal to the original bar velocity to a value where it is little more than half the original bar velocity. However, as the fin thickness $t$ becomes larger than the slot spacing $s$, the increase in rigidity of the finned wave conductor which results counteracts the effect of the increased inertia, so that the phase velocity, and hence the natural frequency of vibration, does not drop appreciably as the fins are further thickened. In the case of the geometry illustrated in FIG. 1, this marginal value of $t/s$ is approximately 1. The exact marginal value of fin width to slot width depends on the ratio $D/d_0$. However, regardless of the latter ratio, the order of magnitude of this marginal value is approximately unity. Furthermore, if the fin thickness $t$ exceeds the value $2(D-d_0)$, operating stress will spread to the outer surface of the fin, so that the fin thickness should be kept within this limit.

In a travelling wave conductor or a standing wave conductor, (i.e., a resonant transducer) shaped as in FIG. 1, the phase velocity becomes exceedingly small as the resonant frequency of the fin is approached. This is illustrated in FIG. 7. In this figure, the ratio $t/s$ (as described in connection with FIG. 6) is assumed to be approximately unity, so that for operating frequencies well below the resonance frequency of the fins, that is, for frequencies below 10 kc./sec., approximately, the ratio of equivalent phase velocity to original bar velocity is a little more than 0.5, as in FIG. 6. Assuming a fin resonance frequency in the vicinity of 35 kc./sec., curve 22 shows that as this frequency of operation is approached the ratio of phase velocity/bar velocity approaches zero very rapidly. This illustrates the mode of operation described above, in which greater reductions of bar velocity are achieved by selecting a fin geometry yielding a fundamental natural frequency of the fins in an "umbrella" mode which is only slightly above the operating frequency of the transducer. It should be noted that FIG. 7 ignores losses in the transducer material, and that actually the low frequency curve 22 does not quite drop to zero at the fin resonance frequency. For operation of the transducer at a frequency above the natural frequency of the fins, there is a frequency zone 23 of poor propagation, in which one would expect some propagation due to secondary effects which are ignored in FIG. 7. For the purposes of the present disclosure this zone is called the "Dead Zone." It is followed by a zone starting at an operating frequency of about 110 kc./sec., where the apparent phase velocity is larger than the original bar velocity, as is shown by curve 24. Therefore, in order to achieve an apparent phase velocity which is lower than the original bar velocity, and hence to lower the resonant frequency of a given transducer, the operating frequency should be below the natural resonant frequency of the fins 17.

Figure 3:
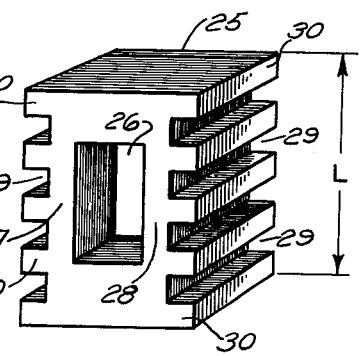
FIG. 3 illustrates a laminated magnetostrictive transducer having inertial members on two opposite sides.

The foregoing criteria are valid for slab-shaped transducers of the kind shown in FIG. 3, as well as for cylindrical-shaped transducers according to FIG. 1. The embodiment of the invention which is illustrated in FIG. 3 is a core 25 consisting of a stack of magnetostrictive laminations, intended for resonant longitudinal vibration in the direction of its long dimension L. The means for interchanging electrical and mechanical oscillatory energy usually consisting of a coil or coils of wire associated with the core 25, are well-known, and are therefore not illustrated. The core has a central aperture 26, so that there are two stem regions 27, 28 which undergo periodic elongation and contraction at the mechanical resonance frequency in the direction of the long dimension L during operation. Slots 29 are machined or otherwise formed in the outer lateral surfaces of these stem regions perpendicular to the laminations to provide inertial members or rectangular fins 30, which have the same function as the fins 17 in FIG. 1. The foregoing discussion in connection with FIGS. 6 and 7 is valid for transducers according to FIG. 3, whether piezoelectric, electrostrictive, or magnetostrictive, and whether or not the aperture 26 is present. As in FIG. 1, the effective inertia of the fins 30 of FIG. 3 can be increased by operating the transducer at a frequency which is near but below the natural frequency of resonance of the fins. In this case, however, instead of an "umbrella" type mode, the fins 30 will undergo a cantilever type mode of resonance vibration.

In a relatively short, for example a half-wavelength, transducer there is little inertia associated with the region in the vicinity of the nodal plane. Most of the inertia is associated with the extremities of a half-wavelength transducer, or in general, with the antinodal regions, which undergo the maximum displacement during operation. On the other hand, there is a maximum of strain energy near the nodal plane, so that the increase in rigidity due to the presence of a fin in the nodal region is particularly significant. It is therefore desirable to make a slot rather than a fin coincide with the nodal plane, as is shown in FIG. 4. A main transducer body 40, intended for resonant longitudinal vibration as a half-wavelength vibrator, has a "slot" 41 in the nodal plane region. Preferably this nodal plane slot 41 is wider than the remaining slots 42 to 47, inclusive, and the fins 48 to 51, inclusive, and 52 to 55, inclusive, gradually increase in thickness as they approach the extremities 56 and 57 of the transducer. This increases the inertia of the fins toward the antinodal regions of the transducer, where the motional amplitude is greater, with the fins having the maximum inertia located at the antinodes. This geometric structure which is valid for slab-type transducers according to FIG. 3 as well as for cylindrical-type transducers according to FIG. 1, provides a larger reduction in operating frequency for a given transducer length while minimizing any increase in rigidity of the transducer.

FIG. 5 illustrates another embodiment of the invention having the advantages of FIG. 4, together with the further advantage, for some applications, of increasing the coupling between the transducer and an adjacent fluid medium (not shown) in the antinodal regions as compared with the nodal region. As is described more fully, and claimed, in my above-mentioned copending applications, various degrees of coupling between a fin-loaded travelling wave conductor and the fluid medium can be achieved by properly adjusting the geometry of the fins. So also, in the case of a standing wave conductor, namely, a resonant vibrator, various degrees of coupling between the transducer based on such a vibrator and the fluid medium, for a given reduction of the resonant length of the transducer, can be achieved by properly adjusting the geometry of the fins. In general, a deep slender fin will produce more coupling, for a given reduction in resonant length, than a short thick fin. In addition to reducing the dimensions of a transducer resonant at a certain frequency, therefore, the various fin structures described above will function to increase the coupling between the transducer and an adjacent fluid medium, such as water. The increased coupling, which (as is explained in my aforementioned copending applications) results from additional injection of fluid as a result of relative motion of the fins, increases the acoustic energy radiated by the transducer when operated as a transmitter. In the case of deep circumferential fins, the acoustic energy radiated can be increased by one order of magnitude. This is particularly desirable at low frequencies, when the radiating surface, namely, the end surface of a longitudinally vibrating transducer, is small in terms of wavelength. Under these circumstances, coupling of the vibrating surface to the fluid medium is poor, and remains so until, for example, the diameter (of a circular radiating surface) measures approximately 70 percent of one wavelength, a condition which cannot be achieved at a low frequency with a structure of practical size.

In FIG. 5, a longitudinal vibrator 60, intended for vibration as a half-wavelength longitudinal vibrator, is constructed similar to FIG. 4 in that it has a relatively wide slot 61 in the region of the nodal plane. The fins 62, separated by slots 63, increase in outer diameter toward the outer or radiating ends 64 of the transducer, while the diameter of the principal vibrator 60 remains constant. Thus, the slots 63 increase in depth toward the free ends, with the result that the coupling between the transducer and a surrounding fluid medium (not shown) becomes gradually greater toward the antinodal regions than it is in the nodal region of the wide slot 61. FIG. 5, like FIG. 4, is schematically representative of piezoelectric, electrostrictive, magnetostrictive and other types of electromechanical vibrators, such as those illustrated by FIGS. 1 and 3. Obviously, the features of FIG. 4 can be combined with those of FIG. 5, particularly if it is desired to thicken the deeper fins to avoid approaching a condition of natural resonance in the deeper fins toward the outer ends 64 of the transducer. By increasing the coupling together with the inertial loading, according to FIG. 5, or FIGS. 4 and 5 combined, the physical size of a transducer can be reduced for operation at very low frequencies while retaining sufficient coupling for useful operation as a transmitter or a receiver.

Another advantage of the embodiments of FIGS. 4 and 5 flows from the facility they afford in controlling the Q of the resulting transducer. As has been indicated above, generally speaking, the natural frequency of mechanical vibration of a transducer can be reduced by adding inertia in order to increase kinetic energy, or by removing material under stress so as to reduce the potential energy during vibration, and in a standing wave transducer (as opposed to a travelling wave conductor) it is most efficient to remove material in nodal areas of vibration, where the maximum stress occurs, and to add inertia elements in the antinodal areas of vibration, where the maximum velocity occurs. Also, as has been mentioned above, the Q of a resonant transducer is raised by the addition of material under stress, since this increases the stiffness, whereas the Q is lowered by the removal of material under stress, since the latter reduces stiffness. The construction of FIG. 4, and the construction of FIG. 5, which has thus far been described, minimize any increase in Q due to the added stiffness contributed by the fins 48 to 55 (FIG. 4) and 62 (FIG. 5) since any resulting stiffness contributed by the fins is located mainly in the antinodal regions. It may be noted that an increase in kinetic energy due to added inertia will also increase the Q, but to a lesser extent than the increase or decrease in Q due to the addition or removal, respectively, of material under stress. As is shown in FIG. 5, holes 66 may be provided in the nodal region of the transducer, to remove transducer material, thereby further lowering the natural frequency of resonance of the transducer and simultaneously lowering its Q. These holes may be made to pass through the transducer transversely to its direction of vibration, as is described and claimed in the aforementioned Kompanek application. The combination of holes 66, to remove transducer material in the nodal region, and fins 62, to add inertial elements in antinodal regions, can be used to achieve a desired low natural frequency of resonance of a given transducer while maintaining the Q of the transducer unchanged, or changed in a desired direction by a controlled amount. This combination can be employed also in transducers according to any one of FIGS. 1, 3 and 4. By using all of the techniques which have been described in connection with FIG. 5, a given transducer can be made to achieve a desired low natural frequency of resonance, a desired degree of coupling to an adjacent fluid medium notwithstanding its small dimension relative to a wavelength, and a desired value of Q; furthermore, these techniques can be employed in a manner which enables each of these parameters to be adjusted substantially independently of the others, since an increase in Q due to fins can be counteracted with holes without affecting the coupling, and coupling can be adjusted by choosing fin geometry which will not noticeably increase the stiffness.

If it is desired to reduce the resonant length of a transducer, without increasing the degree of coupling between the transducer and an adjacent fluid medium, the lateral surface of the transducer can be shrouded in a sheet which isolates that surface from the fluid medium, as is shown in FIG. 8. Here a piezoelectric or electrostrictive transducer 70 is shown, having electrodes 71 and 72 at the ends of a longitudinal resonator body 73. This body is fitted with fins 74 spaced by slots 75. The electrodes 71 and 72 are conveniently supplied with terminals 76 and 77, respectively. A shroud 78 which may be made of any solid plastic material, or of metal, surrounds the sides of the transducer 70, being spaced from the fins 74. At the two end fins, the shroud is held in place by pressure release material such as corprene, rho-c rubber, cork, or a foaming plastic (e.g., isocyanate), or other similar material, in the form of a spacer element 79 located between the lateral side of each end fin and the inner surface of the shroud. Any suitable bonding cement may be used to hold the spacer elements 79 affixed both to the fins and the shroud. The space within the shroud, between it and the transducer body 73 and fins 74 is preferably air or gas filled, so that when water or other liquid medium surrounds the transducer 70 acoustic energy will be at best poorly coupled between the lateral surfaces of the transducer, and the end surfaces to which the electrodes 71 and 82 are affixed are substantially the only energy coupling surfaces.

The same effect can be obtained by filling the slots 75 with a highly compressible air cell material, such as the above-mentioned foaming plastic (not shown); indeed, if the slots 75 are filled with a highly compressible air cell material which keeps the liquid medium out of the slots during operation, the shroud 78 may be dispensed with for many applications, if desired.

Clearly the embodiment of FIG. 8 can take a round, rectangular or any other desired cross-sectional shape, and the transducer body can be magnetostrictive as well as piezoelectric or electrostrictive. If it is magnetostrictive, the usual signal and possibly polarizing coils will be used in place of the electrodes 71 and 72, as is well known to those skilled in the art.

In the type of transducer which is in the form of a ring or hollow shell undergoing axially symmetrical radial vibrations, the resonant frequency is approximately given by the equation:

$$f = c/\pi d$$

where "$d$" is the mean diameter of the shell. The frequency is independent of wall thickness and nearly independent of the length of the shell. The diameter required to produce resonance at a desired frequency can be reduced by a factor of approximately 4 by machining or otherwise forming longitudinal ribs in either the inner surface, as is shown in FIG. 9, the outer surface, as in FIG. 10, or both the inner and outer surfaces as is shown in FIG. 11.

Figure 9:
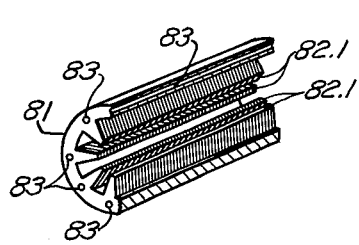
Figure 10:
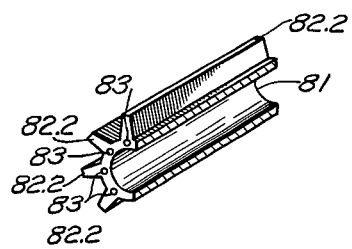

In FIG. 9, a cylindrical transducer body 81 has a plurality of longitudinal fins 82.1 on its inner surface. At the base of each fin, where it joins the cylindrical body 81, a hole or perforation 83 is bored or otherwise formed passing through the body in the axial direction. FIG. 10 is like FIG. 9, except that the fins 82.2 are on the outer surface of the cylindrical transducer body 81. In FIG. 11, a cylindrical transducer body 85 has opposed pairs of axially directed longitudinal fins 86.1 and 86.2 on its inner and outer surfaces, respectively. Holes or perforations 87 pass in the axial direction through the transducer in the region where the base of each fin meets the cylindrical body 85. While two holes or perforations 87 are shown at the base of each fin 86.1 or 86.2 in FIG. 11, and only one hole or perforation 83 is shown at the base of each fin 82.1 in FIG. 9 or 82.3 in FIG. 10, the number of holes or perforations is a matter of choice, depending on the effect desired to be achieved. Just as in the case of the longitudinally vibrating transducer, as described above, the presence of the fins can increase the rigidity as well as the inertia of the cylindrical transducer body. The axial perforations 83 (FIGS. 9 and 10) and 87 (FIG. 11) effectively separate the fins from the cylindrical body in each case, and minimize any increase in rigidity due to the fins. Unlike the longitudinal resonator, a shell-type radially vibrating resonator, such as those shown in FIGS. 9, 10 and 11, has no nodal regions; the velocity and stress are equal throughout the shell. In this case, however, the holes or perforations 83 and 87 reduce the natural frequency of the shell (according to the aforementioned Kompanek application), and at the same time result in a decrease in the Q of the transducer. On the other hand, the addition of fins will raise the Q of the transducer. Here again, a combination of holes or perforations 83, 87, and inertia members 82.1; 82.2; 86.1; 86.2, can be used to control the Q of the transducer, for example to maintain the Q constant.

The fins need not be machined or otherwise formed out of the same material as the cylindrical body in FIGS. 9, 10 and 11. If desired, heavy metal ribs can be fitted into shallow slots formed in the wall of the cylindrical transducer, following the technique shown in FIG. 1.

Another fin or rib structure, which uses a small number of bolted-on masses to introduce bending vibration into a ring vibrator, is shown in Patent No. 2,775,749. The structures shown in FIGS. 9, 10 and 11 of the present application are not predicated on the introduction of bending vibration to lower the effective stiffness of the mass-loaded ring 81 (FIGS. 9 and 10) or 85 (FIG. 11).

Resonance of the ribs in FIGS. 9, 10 and 11 cannot be used to amplify their inertial effect, however, because they are merely mass loads moving in the same direction as the normal transducer vibration. For the same reason, namely that the fins move in the direction of transducer vibrations, these fins do not increase the coupling with a fluid medium. The first of these additional effects can be obtained with a structure according to FIG. 12. Here a cylindrical radial vibrator 90, similar to the cylindrical transducer bodies 81 and 85, is fitted with T-shaped longitudinal axially directed inertia elements 91, which are attached at the bases of their stems 92 to the outer surface 93 of the vibrator. The cross-bars 94 of these inertia elements each form two oppositely directed fins disposed transversely to the direction of normal vibration of the principal vibrator, as in the cases of the longitudinal vibrators described above. In this case, additional effective inertia is obtainable if the two fins comprising each cross-bar 94 vibrate near resonance as cantilever beams (as in FIG. 3). Since in FIG. 12 the stems 92 are relatively thin (compared with the ribs of FIGS. 9, 10 and 11), increase in rigidity of the cylindrical shell 90 is held to a minimum; if desired, axially directed perforations or holes like those in FIGS. 9, 10 and 11 can be added.

The invention is applicable also to transducers of the type known as a "twister," which performs torsional vibrations. A common configuration of this type of transducer is a relatively thick-walled cylindrical shell, for example of barium titanate. The fundamental resonant length of such a transducer is given by the above-mentioned equation:

$$f = c/2L$$

where "c" is now equal to the distortional wave velocity, rather than the bar velocity. The distortional wave velocity is approximately 60 percent of the bar velocity. The resonant length of a "twister" can be reduced by providing it with longitudinal ribs, either formed out of the original transducer material, or added, as described above. A preferred form has the configuration of FIG. 10, the ribs being attached to the outer surface of the twister cylinder. The resonant length can be reduced by this means by a factor of approximately 8. Even greater reductions can be achieved if the ribs have a fundamental resonant frequency, as wide cantilever beams, which lies just above the operating frequency. In these twister embodiments of the invention, longitudinal ribs of a geometry like those shown in FIG. 10 will also increase coupling between the transducer and an adjacent fluid medium.

Figure 13:
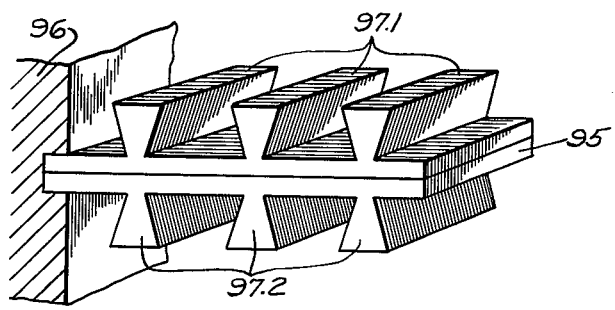
FIG. 13 is a bender-type transducer modified according to the invention.

FIG. 13 shows the invention applied to a transducer 95 of the bimorph type which performs bending or flexural vibrations. The transducer is held in a support 96 at one end, and is free at the other end. Wedge-shaped inertia elements 97.1 and 97.2 are affixed respectively, in pairs to opposite sides of the transducer 95. These inertia elements can be separate elements, or they can be formed directly out of the transducer material, as in the other embodiments herein described. They have large rotational inertia, and thereby mass-load the transducer and reduce the natural frequency of resonance of a given transducer. Resonance of these inertia elements can also be used to magnify their effective inertia, the natural mode of vibration for the wedge-shaped inertia elements being that of inertia wedges vibrating as cantilevers. They can also increase the acoustic coupling between the transducer 95 and an adjacent fluid medium (not shown). They can be effectively decoupled from the principal vibrator 95 by the use of perforations (like those in FIGS. 9, 10 and 11) directed transversely to the principal vibration.

The principle illustrated in FIGS. 4 and 5 according to which the inertia elements are located principally in regions of maximum motion (antinodal regions) can also be applied to the flexural transducer. For the configuration of FIG. 13 this would mean, for example, gradually increasing the sizes of the inertia elements 97.1 and 97.2 progressively from the fixed end of the transducer 95 at the support 96 to the free end of the transducer.

Each of the embodiments of the invention which is described above shows but one means to modify one or more of the dynamic properties of a homogeneous mechanical vibrator intended for use as an element of an electromechanical transducer. Other applications and embodiments of the invention will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. In a homogeneous mechanical vibrator dimensioned for standing wave vibration in a given mode at a given frequency, means to reduce the natural frequency of resonance thereof with respect to standing wave vibration in said mode, comprising at least one inertial element affixed to and projecting from said vibrator a first distance in a direction transverse to the direction of vibration in said mode, said element having a boundary at its free end extending a second distance parallel to the direction of said standing wave vibration, said second distance being not substantially greater than said first distance, the connection between said element and said vibrator being such that vibration of said vibrator to produce said standing wave vibration will induce into said element vibration in a transvere mode having a substantial component parallel to the direction of vibration of said vibrator, said element having a natural frequency of resonance to said transverse mode vibration which is greater than said given frequency.

2. In a homogeneous mechanical vibrator dimensioned for standing wave vibration in a given mode at a given frequency, means to reduce the natural frequency of resonance thereof in said mode comprising at least one inertial element affixed to and projecting from said vibrator, said element being resonant at a frequency above said given frequency to vibration in any mode established therein when said vibrator is vibrated in said given mode, the frequency of resonance of said element being near said given frequency whereby substantial resonant amplification of vibration occurs during operation, and means to introduce a reduction in the Q of said vibrator in opposition to any increase in the Q thereof due to said element.

3. In a homogeneous mechanical vibrator dimensioned for standing wave vibration in a given mode at a given frequency, means to reduce the natural frequency of resonance thereof in said mode comprising at least one inertial element affixed to and projecting from said vibrator, said element being resonant at a frequency above said given frequency to vibration in any mode established therein when said vibrator is vibrated in said given mode, the frequency of resonance of said element being near said given frequency whereby substantial resonant amplification of vibration occurs during operation, and means comprising at least one perforation passing through said vibrator in a direction transverse to the direction of vibration in said mode to introduce a reduction in the Q of said vibrator in opposition to any increase in the Q thereof due to said element.

4. In a homogeneous mechanical vibrator dimensioned for standing wave vibration in a given mode at a given frequency, means to reduce the natural frequency of resonance thereof in said mode comprising at least one inertial element affixed to and projecting from said vibrator, said element being resonant at a frequency above said given frequency to vibration in any mode established therein when said vibrator is vibrated in said given mode, the frequency of resonance of said element being near said given frequency whereby substantial resonant amplification of vibration occurs during operation, and means comprising at least one perforation passing through said vibrator in the region of attachment of said element thereto and being directed transversely to the direction of vibration in said mode, to introduce a reduction in the Q of said vibrator in opposition to any increase in the Q thereof due to said element.

5. In an elongated mechanical vibrator dimensioned for resonant longitudinal vibration at a given frequency, means to reduce the natural frequency of resonance thereof comprising at least one inertial element affixed to and projecting from a side of said vibrator, the dimension of said element in the direction of said longitudinal vibration being not substantially greater than the magnitude of the projection of said element from said side, the connection between said vibrator and said element being such that vibration of said vibrator to produce said resonant longitudinal vibration will induce into said element vibration in a transverse mode having a substantial component parallel to the direction of vibration of said vibrator, said element having a natural frequency of resonance to said transverse mode vibration which is greater than said given frequency.

6. In an elongated mechanical vibrator dimensioned for standing wave longitudinal vibration at a given frequency, means to reduce the natural frequency of resonance thereof comprising at least a pair of inertial elements affixed to and projecting from a side of said vibrator in a direction transverse to the direction of vibration, said elements each having substantially uniform thickness and being spaced apart in said direction of vibration, the ratio of the thickness of each of said elements in said direction of vibration to the spacing between them being approximately unity, the ratio of said thickness of each of said elements to the distance which it projects from said vibrator being not substantially greater than unity, the connection between said vibrator and each of said elements being such that vibration of said vibrator to produce said longitudinal vibration will induce into said elements vibration in a longitudinal mode having a substantial component parallel to the direction of vibration of said vibrator, each of said elements having a natural frequency of resonance to said transverse mode vibration which is greater than said given frequency.

7. In an elongated mechanical vibrator dimensioned for standing wave longitudinal vibration at a given frequency, means to reduce the natural frequency of resonance thereof comprising at least one inertial element affixed to and projecting from a side of said vibrator in the region of an antinode of vibration, the dimension of said element in the direction of said longitudinal vibration being not substantially greater than the magnitude of the projection of said element from said side, the connection between said vibrator and said element being such that vibration of said vibrator to produce said resonant longitudinal vibration will induce into said element vibration in a transverse mode having a substantial component parallel to the direction of vibration of said vibrator, said element having a natural frequency of resonance to said transverse mode vibration which is greater than said given frequency.

8. In an elongated mechanical vibrator dimensioned for standing wave longitudinal vibration at a given frequency, means to reduce the natural frequency of resonance thereof comprising a plurality of inertial elements affixed to and projecting from a side of said vibrator in a direction transverse to the direction of vibration, said elements being spaced apart side by side in the region of an antinode of vibration, the thickness of said elements in said direction of vibration decreasing gradually from the thickest element nearest said antinode to the thinnest element nearest an adjacent node of vibration, said elements being resonant at a frequency above said given frequency to said longitudinal vibration, the frequency of resonance of said elements being near said given frequency whereby substantial resonant amplification of vibration occurs during operation.

9. In an elongated mechanical vibrator dimensioned for standing wave longitudinal vibration at a given frequency, means to reduce the natural frequency of resonance thereof comprising at least one inertial element affixed to and projecting from a side of said vibrator in the region of an antinode of vibration, the dimension of said element in the direction of said longitudinal vibration being not in excess of four times the magnitude of the projection of said element from said side, said element being resonant at a frequency above said given frequency to said longitudinal vibration, the frequency of resonance of said element being near said given frequency whereby substantial resonant amplification of vibration occurs during operation, and means comprising at least one perforation through said vibrator in a direction transverse to said direction of vibration in the region of a node of vibration to introduce a reduction in the Q of said transducer in opposition to any increase in the Q thereof due to said element.

10. In an elongated mechanical vibrator dimensioned for standing wave longitudinal vibration at a given frequency, means to reduce the natural frequency of resonance thereof comprising a plurality of inertial elements affixed to and projecting from a side of said vibrator in a direction transverse to the direction of vibration, said elements being spaced apart side by side in the region of an antinode of vibration, the thickness of said elements in said direction of vibration decreasing gradually from the thickest element nearest said antinode to the thinnest element nearest an adjacent node of vibration, said element being resonant at a frequency above said given frequency to said longitudinal vibration, the frequency of resonance of said element being near said given frequency whereby substantial resonant amplification of vibration occurs during operation, and means comprising at least one perforation through said vibrator transverse to said direction of vibration in the region of said node to introduce a reduction in the Q of said transducer in opposition to any increase in the Q thereof due to said elements.

11. In an elongated mechanical vibrator dimensioned for standing wave longitudinal vibration at a given frequency, means to reduce the natural frequency of resonance thereof comprising a plurality of inertial elements affixed to and projecting from a side of said vibrator in a direction transverse to the direction of vibration, said elements being spaced apart side by side in the region of an antinode of vibration, the lengths of projection of said elements measured from said side increasing gradually from an element of minimum length nearest an adjacent node of vibration to an element of maximum length nearest said antinode, said elements being resonant at a frequency above said given frequency to said longitudinal vibration, the frequency of resonance of said elements being near said given frequency whereby substantial resonant amplification of vibration occurs during operation.

12. In an elongated mechanical vibrator dimensioned for standing wave longitudinal vibration at a given frequency, means to reduce the natural frequency of resonance thereof comprising a plurality of inertial elements affixed to and projecting from a side of said vibrator in a direction transverse to the direction of vibration, said elements being spaced apart side by side in the region of an antinode of vibration, the lengths of projection of said elements measured from said side increasing gradually from an element of minimum length nearest an adjacent node of vibration to an element of maximum length nearest said antinode, said elements being resonant at a frequency above said given frequency to said longitudinal vibration, the frequency of resonance of said elements being near said given frequency whereby substantial resonant amplification of vibration occurs during operation, and means comprising at least one perforation through said vibrator transverse to said direction of vibration in the region of said node to introduce a reduction in the Q of said vibration in opposition to any increase in the Q thereof due to said elements.

13. In a homogeneous mechanical vibrator dimensioned for standing wave vibration in a given mode at a given frequency, means to reduce the natural frequency of resonance thereof in said mode comprising at least one inertial element affixed to and projecting from said vibrator in a direction having a substantial component transverse to the direction of vibration in said mode, said element being resonant at a frequency above said given frequency to vibration in any mode established therein when said vibrator is vibrated in said given mode, the frequency of resonance of said element being near said given frequency whereby substantial resonant amplification of vibration occurs during operation, and means adapted acoustically to shield said element from a fluid medium.

14. In an elongated mechanical vibrator dimensioned for standing wave longitudinal vibration at a given frequency, means to reduce the natural frequency of resonance thereof comprising at least one inertial element affixed to and projecting from a side of said vibrator, said element being resonant at a frequency above said given frequency to said longitudinal vibration, the frequency of resonance of said element being near said given frequency whereby substantial resonant amplification of vibration occurs during operation, and means adapted acoustically to shield said element and side from a fluid medium which may be acoustically coupled to an end of said vibrator.

15. In a cylindrical radial mode vibrator dimensioned for axially symmetrical radial vibration at a given frequency, means to reduce the natural frequency of resonance thereof in said mode comprising a plurality of inertial elements affixed to and radially projecting from said vibrator, said elements being resonant at a frequency above said given frequency to said radial vibration, the frequency of resonance of said elements being near said given frequency whereby substantial resonant amplification of vibration occurs during operation, and means comprising at least one axially directed perforation through said vibrator in the region of its junction with each of said inertial elements to introduce a reduction in the Q of said vibrator in opposition to any increase in the Q thereof due to said elements.

16. In a homogeneous mechanical vibrator dimensioned for standing wave vibration in a given mode at a given frequency, means to reduce the natural frequency of resonance thereof in said mode comprising at least one inertial element affixed to and projecting from said vibrator, said element being resonant at a frequency above said given frequency to vibration in any mode established therein when said vibrator is vibrated in said given mode the frequency of resonance of said element being near said given frequency whereby substantial resonant amplification of vibration of said element occurs during operation.

References Cited in the file of this patent

UNITED STATES PATENTS

| 2,352,311 | Di Toro | June 27, 1944 |
| 2,775,749 | Sussman | Dec. 25, 1956 |